(12) United States Patent
Martin, Jr.

(10) Patent No.: US 6,189,954 B1
(45) Date of Patent: *Feb. 20, 2001

(54) CAB ENCLOSURE PANELS

(75) Inventor: Robert P. Martin, Jr., Avon Lake, OH (US)

(73) Assignee: Martin Sheet Metal, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/203,418

(22) Filed: Dec. 2, 1998

(51) Int. Cl.$^7$ ............................................. B60J 7/00
(52) U.S. Cl. ........................ 296/190.08; 296/190.1; 296/77.1; 296/190.03
(58) Field of Search .................. 296/190.01, 190.03, 296/190.08, 190.1, 190.11, 77.1

(56) References Cited

U.S. PATENT DOCUMENTS

| | | | |
|---|---|---|---|
| 1,650,757 | * 11/1927 | Kraus | 296/190.01 |
| 4,082,343 | * 4/1978 | Hurt, II et al. | 296/190.03 |
| 4,184,712 | * 1/1980 | Skahill | 296/190.03 |
| 4,392,669 | * 7/1983 | Martin, Jr. | 296/190.1 |
| 4,408,672 | * 10/1983 | Albright et al. | 296/190.03 |
| 4,652,037 | * 3/1987 | Thau et al. | 296/77.1 |
| 4,772,065 | * 9/1988 | Nakata et al. | 296/190.08 |
| 4,940,280 | * 7/1990 | Templeton | 296/190.03 |
| 4,986,593 | * 1/1991 | Lohmann | 296/190.1 |
| 5,076,635 | * 12/1991 | Larkin et al. | 296/190.1 |
| 5,076,637 | * 12/1991 | Larkin et al. | 296/190.1 |
| 5,203,601 | * 4/1993 | Guillot | 296/77.1 |
| 5,273,340 | * 12/1993 | Nelson et al. | 296/190.08 |
| 5,286,081 | * 2/1994 | Martin, Jr. | 296/190.08 |
| 5,413,188 | * 5/1995 | Ui | 296/190.08 |
| 5,450,917 | * 9/1995 | Goddard | 296/190.1 |
| 5,577,795 | * 11/1996 | Shinsen | 296/190.01 |

FOREIGN PATENT DOCUMENTS

162116 * 2/1951 (CA) ................. 296/190.01

* cited by examiner

Primary Examiner—Joseph D. Pape
Assistant Examiner—Kiran Patel
(74) Attorney, Agent, or Firm—Pearne & Gordon LLP

(57) ABSTRACT

A set of panel assemblies for enclosing the overhead guard of a vehicle such as a skid steer comprising a windshield/door assembly and side window assemblies. The windshield/door assembly includes a door jamb that is clamped over the front corner posts of the overhead guard and a windshield/door unit hinged on the jamb. The windshield/door unit seals against a generally planar front face of the jamb. The side window assemblies comprise transparent rigid plastic sheets adapted to be attached to the side grille of the overhead guard in a simplified manner and without occupying excessive space in the clearance area between the overhead guard and operating elements such as the lift arms of a bucket.

9 Claims, 5 Drawing Sheets

CAB ENCLOSURE PANELS

BACKGROUND OF THE INVENTION

The invention relates to cabs for land vehicles and, more particularly, to a cab construction for use with vehicles having an existing overhead guard.

PRIOR ART

Severe weather and other environmental conditions can create a need for a fully enclosed cab to protect the operator of a tractor or like machine. Frequently, a tractor is originally built with an overhead guard to provide roll over protection and/or protection from falling objects. U.S. Pat. No. 5,286,081 discloses a cab construction that successfully solves problems attendant with providing a serviceable and cost effective cab structure for certain types of machinery.

An increasingly popular style of tractor is the skid steer loader, hereinafter skid steer, which affords high maneuverability enabling it to be operated in relatively small areas. These skid steers typically have an operator seat in a forward position to provide a view immediately in front of the machine. Also typical of skid steer designs is the location of the lift arms for carrying and lifting a material handling bucket or other implement. The arms extend longitudinally of the machine on both sides of and immediately adjacent the operator station. To ensure against an operator inadvertently extending a hand or limb to the side and into the path of the lift arms, the operator station is equipped with side guards. Normally, the side guards are in the form of a grille that permits vision to the side but prevents extension of a hand or limb to the side. The side grilles generally are fixed to the overhead guard that is part of the original equipment. As a design criteria, a skid steer is a compact machine where little space or clearance is afforded between parts. This characteristic presents difficulties in fitting such a machine with a windshield or side windows.

Besides being economical to construct and easy to install, a cab enclosure should be simple and easy to remove and reinstall where it is used, for example, to protect the operator during seasonal periods only, such as during winter months.

SUMMARY OF THE INVENTION

The invention provides a panel arrangement for enclosing the operator station cab of a vehicle that as originally manufactured includes an overhead guard. More specifically, the disclosed panel arrangement can include a combination door and windshield assembly for ingress and egress to the operator station and side window panels for sealing other areas surrounding the operator station. The windshield/door front panel assembly incudes a base panel door jamb that frames the door opening and is adapted to carry a swingable door on associated hinges. The door jamb panel presents a planar face that surrounds the door opening. The door has a peripheral seal, ideally, in the form of an elastomeric weatherstrip that reliably fully contacts the planar surface of the door jamb panel. Preferably, the door is hinged and configured to open with a simple outwardly swinging motion avoiding interference with the original standard parts of the vehicle.

On a typical skid steer the door jamb panel can be configured to lay over the front corner post of the overhead guard and to laterally engage these posts between a pair of integral opposed flanges disposed on the side faces of the posts. The door jamb panel is locked to the corner posts by a plurality of clips bolted or other otherwise secured to the panel plate and interlocking with the corner posts.

Cab side window panels constructed in accordance with the invention take advantage of the existing rigid grille side walls customarily found on the overhead guard of a skid steer. In effect, the side panels of the invention utilize the guard as a support structure thereby avoiding the need to provide the side panels with a separate frame. The side panels, made of clear transparent sheet stock material, are secured to the side grilles with a plurality of screws or like fasteners set into individual blocks extending on the inside face of the grille at strategic locations across the expanse of the side panels. The blocks are proportioned to ensure that the side panel sheets are drawn sufficiently tight against the grille to compress a weatherstrip sealing bead adjacent the perimeter of the panels. The disclosed mounting arrangement provides an adequate seal between the panels and overhead guard and, additionally, provide a simple mounting arrangement that takes up relatively small space in the limited clearance area between the sides of the overhead guard and the lift arms. Moreover, the unique mounting blocks enable the panels to be mounted by a single workman working from the outside of the cab.

DESCRIPTION OF THE PREFERRED EMBODIMENT

Figure 1:
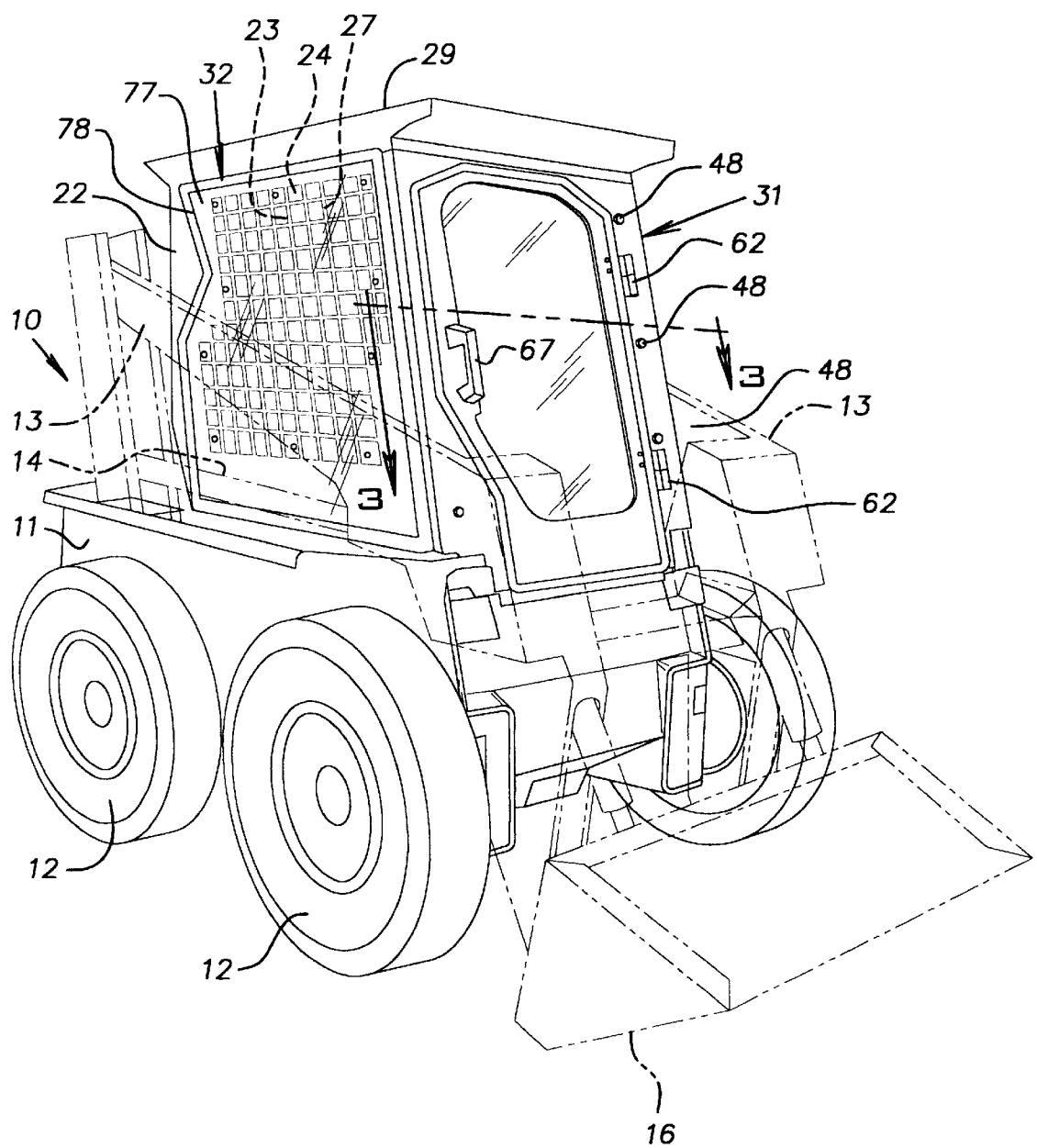
FIG. 1 is a perspective, somewhat schematic, view of a skid steer vehicle fitted with the cab enclosure panels of the invention.
Figure 2:
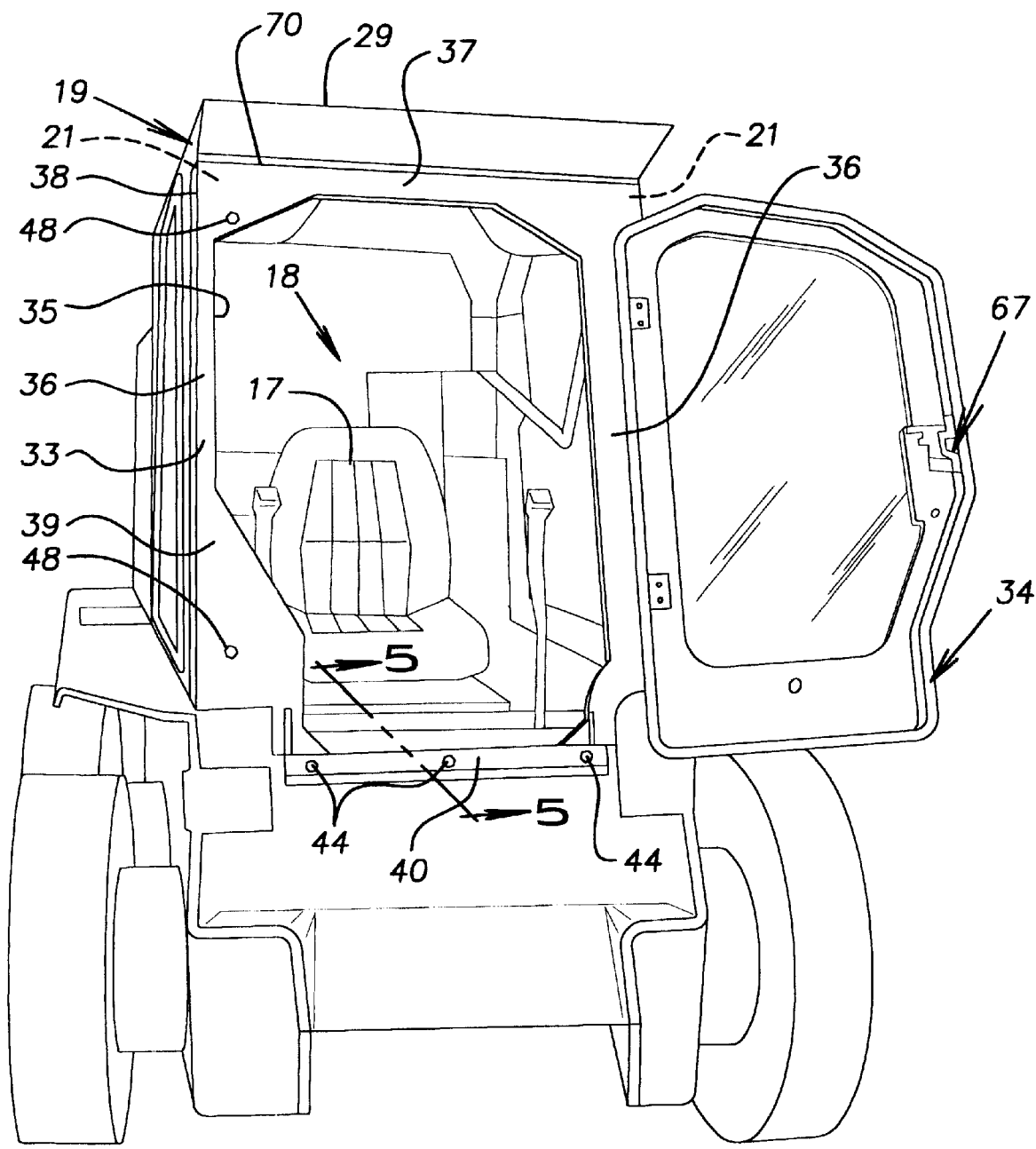
FIG. 2 is a front view of the skid steer with the windshield/door unit in an open position.

Referring now to the drawings, there is shown a land vehicle 10 in the form of a skid steer loader, referred to as a skid steer herein. The skid steer is generally conventional in overall layout having a fabricated steel chassis 11, a set of four wheels 12, and a motor, not shown, adjacent the rear of the vehicle. The illustrated skid steer 10 has a pair of spaced lift arms 13 on opposite sides of the chassis 11, operated by hydraulic piston and cylinder actuators 14. The arms 13 lift a bucket 16 or other working implement at the front of the skid steer 10.

A person operating the skid steer 10 sits in a seat 17 in an operator's station generally indicated at 18. The operator station 18 is surrounded by an overhead guard 19 that has four generally upright corners, the front corners or corner posts being designated by the numeral 21 and the rear corner or corner posts being designated by the numeral 22. The corner posts 21, 22 generally form the boundaries of the front, sides and rear faces of the overhead guard 19. The rear face of the guard is typically closed by a steel panel and/or a type of safety glass. The front face of the guard 19, as it is originally manufactured for the skid steer 10, is open to allow the operator to enter and exit.

At each side, the overhead guard 19 has a rigid grille 23 with sufficient openings 26 throughout its expanse to permit the operator to see through it in order to afford an adequate view of the surrounding field. In the illustrated case, the grilles 23 are formed by cutting rhomboid shaped openings or apertures 26 in a heavy gauge steel sheet 24. The openings 26 leave an integral network or matrix 27 of intersecting steel strips. The remaining steel network 27, after the holes 26 have been cut is effective to prevent an operator from inadvertently extending his hand or arm outward beyond the plane of the side grille or guard 23 into the operating path of a lift arm 13. Other grille constructions, such as a welded wire mesh are contemplated.

Figure 3:
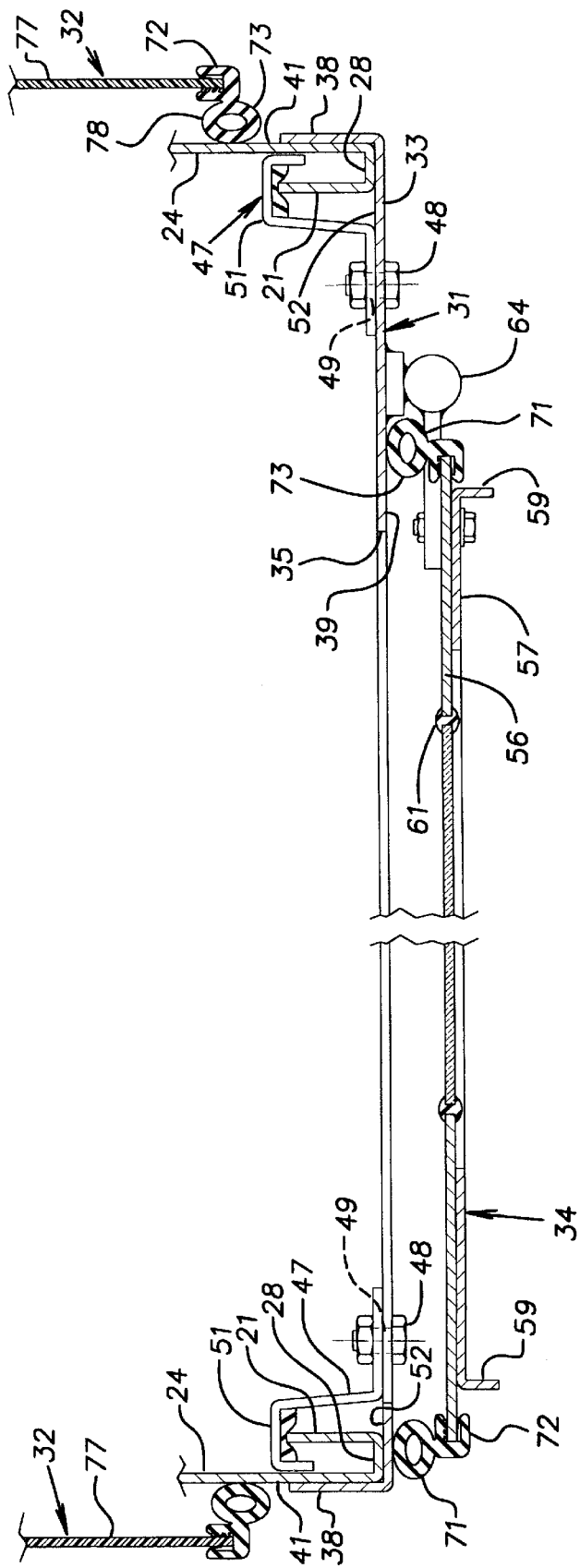
FIG. 3 is a cross-sectional view taken in a horizontal plane indicated by the arrows 3—3 in FIG. 1 of the front part of the overhead guard of the vehicle and the windshield/door unit.
Figure 4:
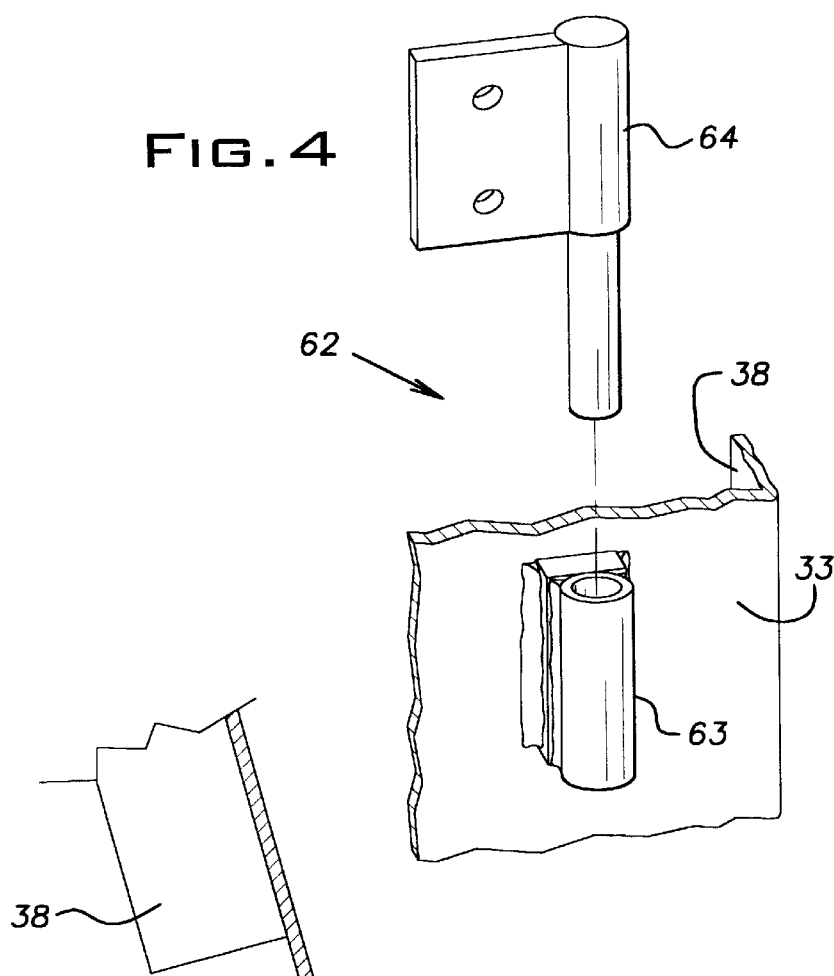
FIG. 4 is a fragmentary perspective view of a hinge for the windshield door unit.

The front corner posts 21 are efficiently made by breaking non-apertured areas of the steel sheet forming the side grille 23 into a U-section 28 as shown in FIG. 3. Alternate corner post constructions are contemplated such as rectangular steel tubes welded to a side wall grille. The corner posts 21 and 22 support a steel sheet 29 forming the roof of the overhead guard in a conventional manner. The lower ends of the corner posts extend down and are supported on the chassis 11. The overhead guard 19 may be pivotally mounted at the rear corner posts to allow it to be swung upwardly and rearwardly for access to the drive train and other parts of the skid steer in a conventional manner. Where the overhead guard 19 is counter-balanced in this pivoting action by gas springs or other conventional devices it is desirable that accessory parts such as the protective panels of the invention to be described hereinbelow are of lightweight construction so as to avoid re-engineering of the factory supplied cab counter-balancing springs.

The above-described skid steer construction details are similar if not the same, in the products of various skid steer manufacturers. The overhead guard serves to protect the operator in a roll-over or from falling objects as well as to laterally confine his limbs so as to prevent their inadvertent extension into the path of the side lift arm mechanisms.

The invention provides a front panel assembly 31 that serves as a windshield and door and side panel assemblies 32 to enclose the space within the overhead guard 19 and thereby protect the operator from severe weather or other adverse conditions such as a dusty environment.

Figure 5:
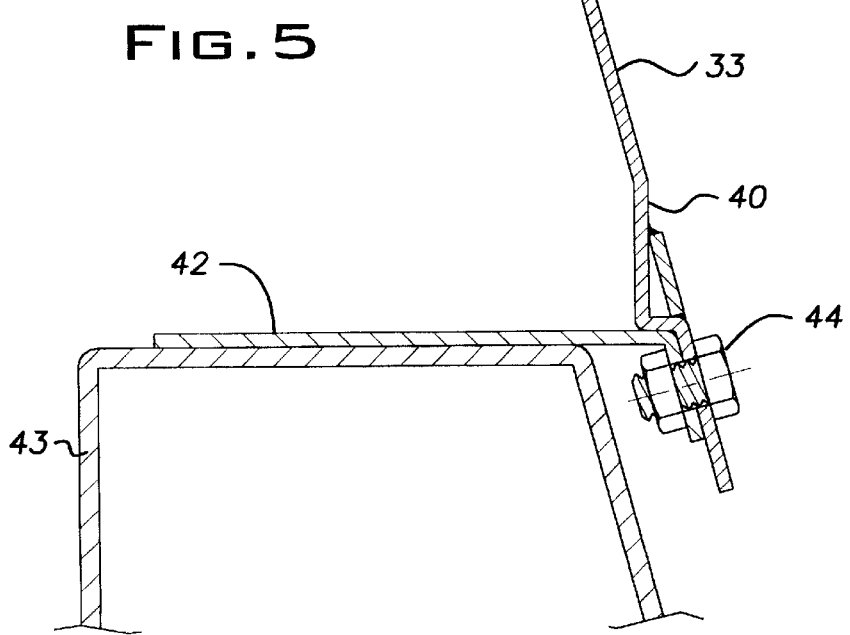
FIG. 5 is a fragmentary cross-sectional view taken in the vertical plane indicated by the arrows 5—5 in FIG. 2 of a portion of the vehicle and a door jamb panel assembly of the invention.
Figure 6:
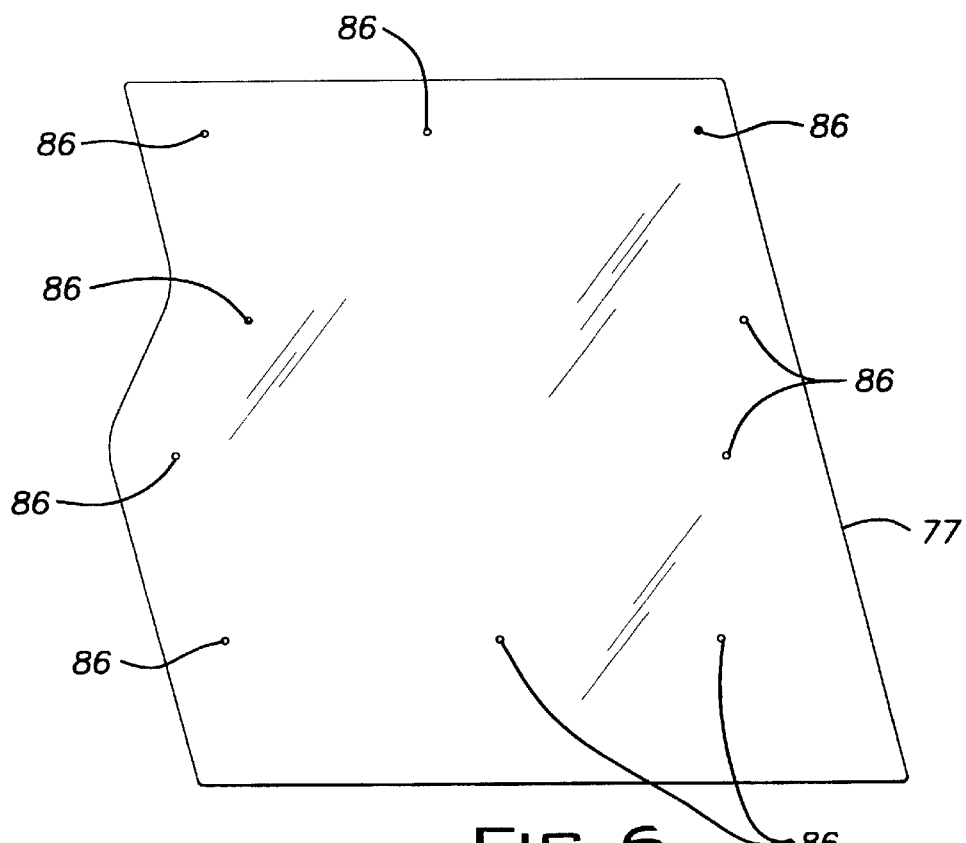
FIG. 6 is a side view of a transparent sheet of a side window panel assembly.

The front panel assembly 31 includes a base panel 33 that serves as a jamb for a door assembly 34. The door jamb base 33 is preferably fabricated of sheet steel and, in the illustrated case, is in the form of a generally rectangular continuous outline having a large generally rectangular cutout 35. The door jamb panel or base 33 has integral sides 36, header 37, and threshold 40. The generally vertical sides 36 of the door jamb 33 have integral flanges 38 bent perpendicularly rearwardly to the plane of a front face 39 of the major part of the door jamb. When installed on the overhead guard 19, this front planar face 39 is generally upright and slopes somewhat to the rear to conform to the slight inclination of the front corner posts 21. The flanges 38 are spaced from one another so that they fit closely over respective ones of the corner posts 21 of the overhead guard 19. More specifically, the flanges 38 overlie faces 41 of the corner posts 21 on the sides of the overhead guard. A sheet metal angle 42 forms a threshold for the door opening or cutout 35 and, as is shown in FIG. 5, is formed to seat on a cross member 43 of the skid steer chassis 11. A plurality of bolts 44 lock the door jamb 33 and threshold angle 42 together. With a flange of the threshold angle 42 resting on the cross member 43, the angle vertically supports the door jamb on the chassis 11. Upper portions of the door jamb 33 are removably fixed to the overhead guard 19 by J-shaped clips 47 located at a plurality of points along the length of the corner posts 21. The clips 47 are locked in position by bolts 48 that extend through holes 49 vertically spaced on the vertical sides of the door jamb 33. Study of FIG. 3 reveals that the door jamb 33 is laterally located and locked in position on the overhead guard by the integral flanges 38 which abut or nearly abut the side faces 41 of the corner posts 21. The door jamb 33 is locked against forward or rearward movement by the action of J-clips 47 which capture the corner posts 21 between retaining portions 51 of these clips and rear surface areas 52 of the door jamb plate 33. It will be understood that the door jamb 33 is thus releasably mounted to the overhead guard 19 and, particularly, to the front corner posts of the guard by surface areas of the jamb 33 and clips 47 which prevent any relative movement between the jamb and the corner posts but do not structurally alter the corner posts. In the preferred embodiment, the clips 49 at each side of the jamb 33 are relatively short in their vertical dimension, for example, being 1-½" tall. It is contemplated that the several clips at each side can be replaced by a continuous clip having a length comparable to the full length of a corner post.

The door assembly 34 is fabricated from steel sheet stock and includes a pair of sheets 56, 57 which are generally rectangular in their front profiles and have large cutouts for a windshield 58. An outer one of the sheets 57 has its edges bent outwardly to form a peripheral flange 59 for stiffening purposes. The sheets 56 and 57 are welded together at appropriate points to form a rigid structure. The windshield 58, made of safety glass, is carried on the inner one of the sheets 56 through the use of a conventional elastomeric mounting piece 61 along the perimeter of the glass, as is conventional. The door assembly 34 is hinged on one side of the door jamb 33 and is latched on the opposite side of the jamb. The hinge arrangement can comprise a pair of hinges 62. Portions 63 of the hinges 62 associated with the door jamb 33 can be welded directly to the door jamb. Mating portions 64 of the hinges 62 can be bolted to the door assembly 34; slots or oversize holes in the door allow the door to be adjusted for a proper fit with the latch on the opposite side. The latch, indicated at 67 is a commercially available unit that is hand-operated from either the inside or outside of the guard 19. A top 70 of the door jamb plate 33 lies below the plane of the underside of the overhead guard roof plate.

The periphery of the door sheet 56 is fitted with a commercially available elastomeric weatherstrip 71. The weatherstrip 71 includes an integral channel 72 which grips the peripheral edge of the sheet 56 and a hollow bulb 73 which permits the weatherstrip to compress so that it can seal surfaces which are not precisely parallel or planar in a known manner. It will be seen that the weatherstrip 71 is compressed and seals against the outer surface of the door jamb 33 which, as described, is substantially planar. The weatherstrip 71 has sufficient compliance, due to the bulb 73, to accommodate a slight offset of the lower threshold area of the door jamb 33 which projects slightly outwardly, as shown in FIG. 5. FIG. 3 shows the door assembly 34 in the closed position against the door jamb 33.

Figure 8:
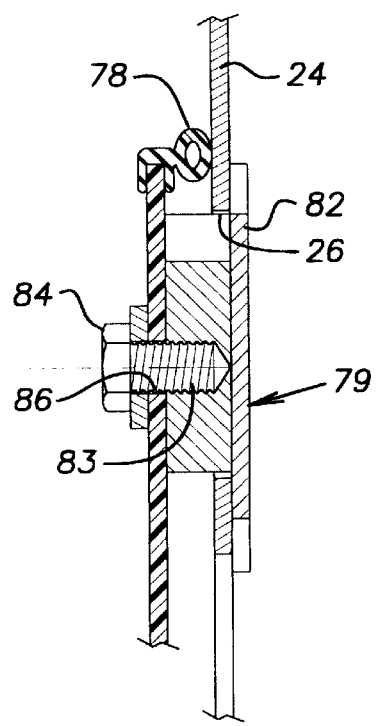
FIG. 8 is a fragmentary cross-sectional view taken in a vertical plane showing a typical installation of a side window panel on a side grille of the overhead guard.
Figure 7:
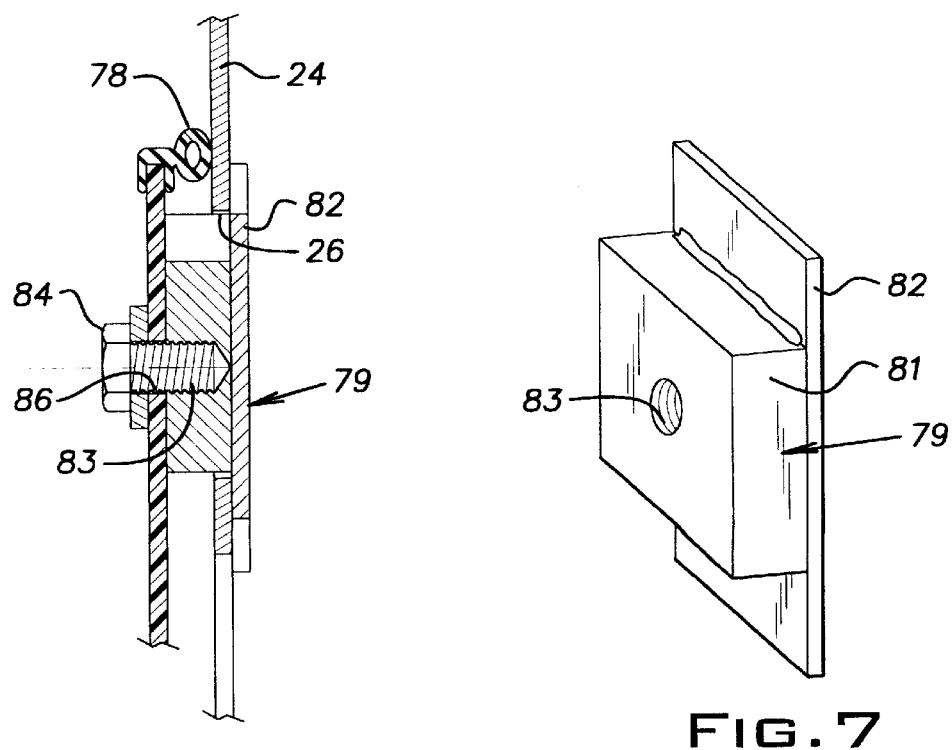
FIG. 7 is a view of a typical block for securing a 12 side window assembly to the side grille of the overhead guard.

Optionally used with the front panel assembly 31 are the pair of side panel or side window assemblies 32. The side window assemblies 32 are in the form of left and right units that are mirror images of one another. Each side window assembly 32 includes a transparent sheet 77 preferably of a thermoplastic material such as polycarbonate or polyvinyl chloride or a suitable glass such as laminated safety glass or a tempered glass. The illustrated side window sheet is made of ⅛" or ¼" polycarbonate. The outline of a sheet 77 is cut in accordance with a boundary surrounding the side grille 23 so that its edges lie on those parts of the steel sheet 24 surrounding the grille 23. The typical skid steer has a generally planar boundary formed by parts of the overhead guard sides surrounding the grille or mesh protector. In instances where a side surface is not planar, suitable filler pieces can be provided to create a planar surface against which a side window assembly can seal. Alternatively, the side window assemblies can be non-planar to match the guard configuration. The side window assembly includes a weatherstrip 78, such as described in connection with the door assembly 34, fitted on the periphery of the window sheet 77. The side window assemblies 32 are releasably mounted on the overhead guard 19 with a series of identical mounting blocks 79. The mounting blocks or clips 79 in the illustrated example are square or rectangular units including a main body 81 and a flange forming plate 82. The illustrated main body and flange plate are steel pieces welded together. The main body 81 has a tapped hole 83 in its central region perpendicular to the plane of the flange plate. A plurality of mounting blocks are assembled on the window sheet 77 generally along but spaced inwardly of its periphery. The mounting blocks are retained on the sheet 77 by screws 84 assembled through holes 86 strategically located in the sheet 79. The holes 86 are located on the sheet 77 so that the mounting blocks 79 are registered with selected holes 26 provided by the grille or network 27. It will be understood that the flange plate or major profile of the mounting block or clip 79 is arranged to pass through its respective hole 26 when the block has a certain angular orientation about the axis of its screw 84 and hole 86. It will be understood that all of the mounting blocks 79 can be moderately tightened with their respective screws 86 against the window sheet 79 prior to mounting of the window assembly 32 on its respective overhead guard side grille 23. A workman can then install the window assembly 32 on the guard side grille 23 by tightening successive ones of the screws 86. Initial tightening movement of a screw 86 will rotate the block 79 so that the block is no longer oriented with the rectangular or rhomboidal pattern of its associated hole 26 and, consequently, the block and adjacent portion of the side window is fixed to the side grille 23. The blocks 79 are proportioned to moderately compress the weatherstrip bulb 73 against the side sheet 24 when the mounting block flange plate or tab 82 is in contact with the inside surface of the side sheet 24 (FIG. 8). To summarize, the mounting block in its original orientation for installation can pass freely through the associated grille hole 26 but when the screw 86 is thereafter tightened, the mounting block rotates a limited degree so that the flange plate is misaligned with the hole and cannot pass freely back out through such hole. The main body 81 is proportioned so that the mounting block cannot rotate through an angle approaching 90°. It will be understood that the side window assemblies can be installed by a single mechanic working comfortably outside of the overhead guard 19. The blocks 79 or their equivalents can be extruded or molded of suitable metal or plastic material.

From the foregoing description, it will be understood that the front panel assembly 31 and side panel assemblies 32 are capable of being proportioned to fit various skid steer units manufactured by different companies. The front and side panel assemblies, are readily installed and removed as desired from season to season or job to job. Moreover, the side panel assemblies can be used without the front panel assembly and vice versa depending on the operator's preference.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A kit for enclosing an overhead guard of a vehicle such as a skid steer comprising a door/windshield unit and side window assemblies, the door/windshield unit comprising a door jamb separate from and adapted to overlie both the front corner posts of the overhead guard, the jamb providing hinge members adjacent one corner post and providing a generally planar face across the top and two sides of a door opening, a door assembly hinged on said hinge members and capable of sealing against said planar face when closed, the side window assemblies comprising transparent rigid plastic sheets and peripheral weatherstripping having a narrow edge profile whereby they can be externally attached over a side grille of the overhead guard without interference with moving parts of the vehicle such as lift arms for a bucket or the like.

2. A kit as set forth in claim 1, wherein the door jamb has a generally rectangular frame having as elements a generally horizontal header, generally vertical sides and a generally horizontal threshold, the jamb elements having surfaces that form said generally planar face, the side elements having rearwardly directed flanges that are adapted to interact with the corner posts of the vehicle's overhead guard to laterally locate the door jamb on the overhead guard, the threshold having a flange adapted to rest on a portion of the chassis of the vehicle to support the weight of the door jamb and the door assembly, said hinge members being on one of the side elements for pivotally supporting the door assembly about a generally upright axis, the door assembly having a hinged side associated with said hinge members and a latch on a side opposite its hinged side, the door assembly having a closed position where it seals against the planar face of the door jamb, the door assembly including a relatively large windshield that extends over a majority of a frontal area presented by the jamb and door assembly.

3. A kit as set forth in claim 2, wherein said flanges of said side elements are located at the laterally outward extremities of the side elements whereby they are adapted to envelope the outside surfaces of the corner posts.

4. A kit as set forth in claim 2, including clamp elements on said door jamb that capture the front corner posts between themselves and the door jamb to prevent relative forward and rearward movement between the jamb and the overhead guard.

5. A kit as set forth in claim 4, wherein said clamp elements are removably retained by bolts carried by said door jamb.

6. A kit as set forth in claim 1, wherein said side window assemblies have their transparent sheets generally config ured as a polygon with a perimeter, a compressible weather strip having a sealing surface attached to the perimeter of the sheet such that its sealing surface is at a plane spaced from the plane of the sheet, and a plurality of fastening elements spaced inwardly from the perimeter of the sheet such that the fastening elements can engage a grille of an overhead guard in a zone surrounded by said perimeter.

7. A kit as set forth in claim 6, wherein said fastening elements include gripping tabs to engage interior surfaces of the grille.

8. A kit as set forth in claim 6, wherein said fastening elements are block-like structures adapted to pass through a grille opening and releasably lock onto the grille when rotated through a limited angle when in said opening.

9. A kit as set forth in claim 8, wherein said fastening element blocks are arranged to compress said weatherstripping when the window assembly is mounted on the side of an overhead guard.

* * * * *